US007721869B2

(12) United States Patent
In 'T Hout

(10) Patent No.: US 7,721,869 B2
(45) Date of Patent: May 25, 2010

(54) APPARATUS AND METHOD FOR MOVING A MINE CONVEYOR SEGMENT

(75) Inventor: Cornelis Wilhelm In 'T Hout, Gouda (NL)

(73) Assignee: Superior Highwall Miners, Inc., Beckley, WV (US)

( * ) Notice: Subject to any disclaimer, the term of this patent is extended or adjusted under 35 U.S.C. 154(b) by 536 days.

(21) Appl. No.: 11/569,520

(22) PCT Filed: May 25, 2004

(86) PCT No.: PCT/NL2004/000372

§ 371 (c)(1),
(2), (4) Date: Jul. 12, 2007

(87) PCT Pub. No.: WO2005/116402

PCT Pub. Date: Dec. 8, 2005

(65) Prior Publication Data

US 2008/0260509 A1 Oct. 23, 2008

(51) Int. Cl.
*B65G 15/26* (2006.01)

(52) U.S. Cl. ...................... 198/313; 198/300; 198/812; 299/67

(58) Field of Classification Search ................. 198/300, 198/303, 312, 313, 314, 315, 594, 812; 299/67
See application file for complete search history.

(56) References Cited

U.S. PATENT DOCUMENTS 3,135,502 A * 6/1964 Muehlman .................. 198/313
4,474,287 A * 10/1984 Thompson .................. 198/812
4,969,691 A * 11/1990 Moore et al. ................ 198/812
5,232,269 A * 8/1993 Addington et al. ............ 299/67
5,370,218 A * 12/1994 Johnson et al. ............. 198/584
5,692,807 A 12/1997 Zimmerman ................. 299/67
5,715,958 A 2/1998 Feider et al. ................ 212/273
6,042,191 A 3/2000 Antoline et al. ............... 299/67

FOREIGN PATENT DOCUMENTS

EP 0 919 509 6/1999
WO WO 95/30067 11/1995

* cited by examiner

*Primary Examiner*—James R Bidwell
(74) *Attorney, Agent, or Firm*—Renner, Otto, Boisselle & Sklar, LLP

(57) ABSTRACT

The invention provides an apparatus for moving a mine conveyor segment (2, 3) between a first position in line with a train of conveyor segments and a second storage position out of line with the train of conveyor segments, comprising: a segment holder (9), and a guide (8) for guiding the movement of the segment (2, 3) between the first and the second position, wherein the apparatus is connectable to a device (102) for manipulating the train of conveyor segments such that the segment holder (9) is at least partially movable independent from the train manipulating device (102). The handling of the conveyor segments (2, 3) in the first position is not decisive for the status of the apparatus according the present invention, and therefore the handling of the segments outside the first position can coincide (overlap) with the operating of the launch platform.

15 Claims, 5 Drawing Sheets

APPARATUS AND METHOD FOR MOVING A MINE CONVEYOR SEGMENT

Figure 1:
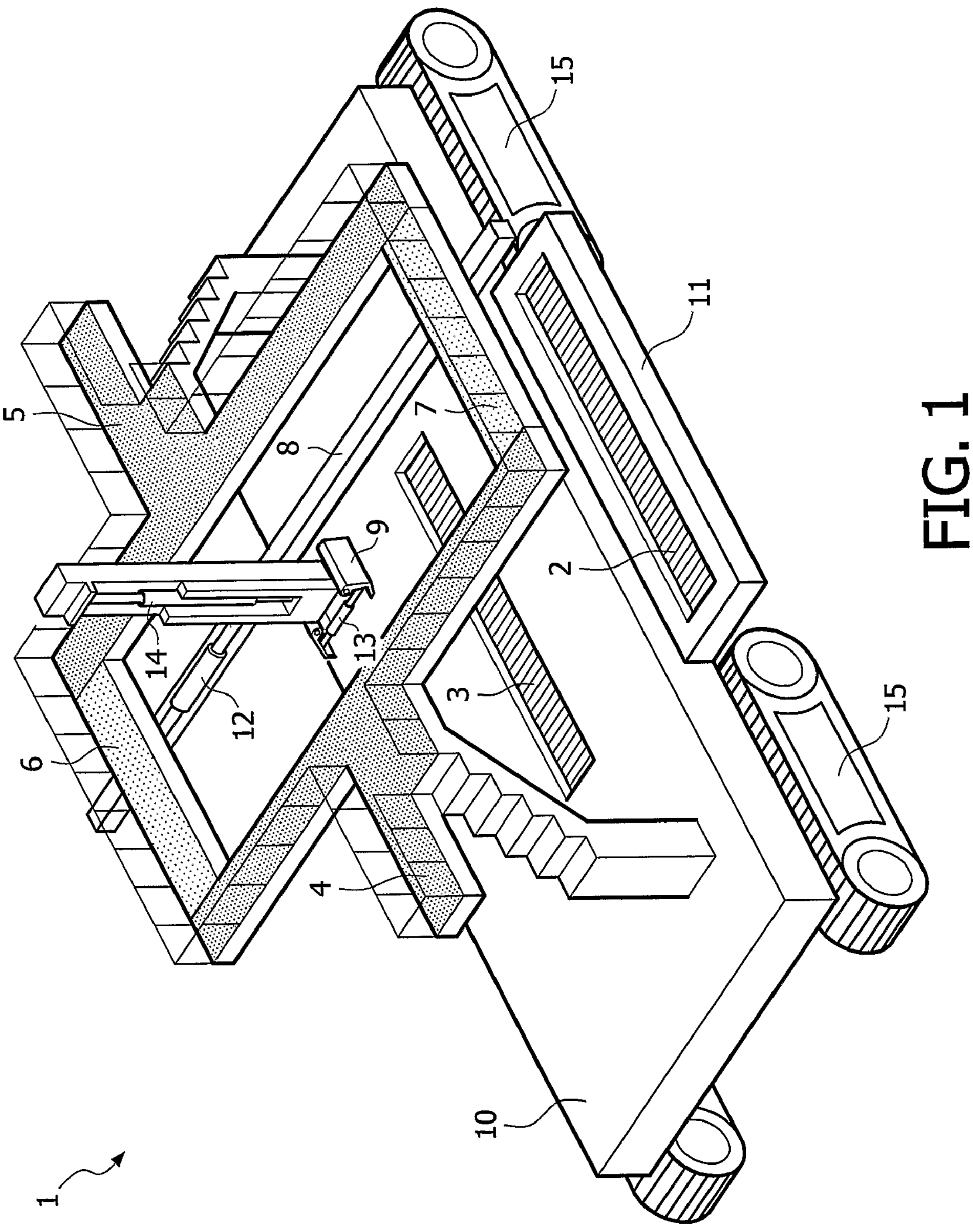

This application is a national phase of International Application No. PCT/NL2004/000372 filed May 25, 2004 and published in the English language.

The invention relates to an apparatus for moving a mine conveyor segment between a first position in line with a train of conveyor segments and a second storage position out of line with the train of conveyor segments. The invention also relates to a method for moving a mine conveyor segment between a first position in line with a train of conveyor segments and a second storage position for at least one conveyor segment out of line with the train of conveyor segments.

Highwall mining is conducted for removing coal, or minerals, ores or other materials in seams or veins under an overburden which may be accessed from an exposed edge of the seam or vein. Highwall mining is applicable where the appropriate machinery can be placed in a cut or bench to extend a cutterhead, followed by a train of conveyor segments or units as the cutterhead advances, into a substantially horizontal shaft under the overburden. The conveyor segments are also known as push beams, as they are not self-propelled; rather they are pushed into the mine. Each conveyor segment has augers or a conveyor belt to move coal from its lead end to its rear end and further onto the next rearward conveyor segment, and to the launch bed ultimately. The augers or conveyor belts can be powered by shafts connected from one conveyor segment to the next, ultimately turned by a motor on the launch vehicle or by a motor at the cutterhead end of the train. The present invention relates the handling of these conveyor segments. Also provision must be made for stringing cable the length of the train so power may be available at the cutterhead.

A commercially successful highwall mining apparatus is described in U.S. Pat. No. 6,042,191, including a description of a launch vehicle for adding conveyor segments to a train, and particularly for assuring that the conveyor segments are operational as soon as they are added to the train. Before coupling and after uncoupling a conveyor segment the segments have to be manipulated. This manipulation of the segments is operating time consuming. Another disadvantage of the prior art manipulating is that adding new conveyor segments to the train or removing conveyor segments from the train idled the entire train for a period of time.

The present invention has for its object to provide a method and apparatus for manipulating a mine conveyor segment faster and more efficient than the manipulating according the prior art.

The invention provides for this purpose an apparatus for moving a mine conveyor segment between a first position in line with a train of conveyor segments and a second storage position out of line with the train of conveyor segments, comprising: a segment holder, and a guide for guiding the movement of the segment between the first and second position, wherein the apparatus is connectable to a device for manipulating the train of conveyor segments such that the segment holder is at least partially moveable independent from the train manipulating device. The handling of the conveyor segments in the first position is thus not decisive for the status of the apparatus according the present invention. As the manipulator can handle conveyor segments while the conveyor segment launch platform (that incorporates the first position) is for instance moving the train of segments, the handling of the segments outside the first position can coincide (overlap) with the operating of the launch platform. The parallel operating of a launch platform and the manipulator according the present invention will shorten the cycle time of the combined processes compared to the serial handling processes according the prior art. The enhanced efficiency of conveyor segment manipulation results in the decrease of idling time required during the addition of conveyor segments to the train. The independent handling steps of the segments makes it more simple to mechanise and control the different process steps and also enhance the flexibility of the mining equipment. The apparatus according the invention can cooperate with the existing launch platforms but it is also possible to simplify the construction of a launch platform. The manipulator according the present invention can furthermore also be use for the manipulating of other (mining) equipment than the segments; for instance drive units, spare parts, cutter heads, parts of the launch platform and so on.

In a preferred embodiment of the present apparatus the segment holder is displaced relative to the guide by hydraulic actuating means. The use of hydraulic actuators (or fluid cylinder drive system) makes that the segment holder can be moved with both high power and high speed thus enabling a high processing speed of the conveyor segments. Furthermore the guide makes the movement to be controlled simple. The apparatus is easy to build and use can be made of a frame like the frame of an overhead crane assembly. Furthermore the present apparatus can have a solid construction. This makes the apparatus particularly useful in high wall coal mining, and it significantly reduces the time required for addition of a conveyor segment to a train of conveyor segments.

In an other preferred embodiment the segment holder is displaceable with at least two levels of freedom. For instance these two levels of freedom can be generated by the combination of a substantially horizontal and a substantially vertical linear guide. This design permits manipulation of conveyor segments rapidly to the end of the train as the manipulated conveyor segment may he poised directly above a previous added conveyor segment (first position) before it is moved with the train into the mine. Indeed, the segment to be added may begin its descent into place even before the next previous segment has moved, following the train, completely out of the first position (normally the launch platform).

In yet another preferred embodiment the apparatus is constructed of releasable modules, the modules comprising: a lower frame structure, a front intermediate module, a rear intermediate module, at least one bridge module carrying the segment holder and the guide, wherein the bridge module is releasable connectable to the intermediate modules, which intermediate modules are releasable supportable by the lower frame structure. On of the advantages of releasable modules is that the can readily assembled and readily disassembled thus providing the ability to move an entire manipulation apparatus quickly from one site to another in disassembled condition. Also, as highwall mining becomes capable of mining at increasing mine lengths, there is a need for a better stabilized launch machine and associated loader/unloader. The tendency for instability is notable not only from the demand for increased speed in the loading and unloading procedures, but also the fact that longer trains mean increasing mass inside the mine, which has to be moved in and out as well as thrust against the mining surface. In addition, longer train lengths mean increasing the weight of cable on the reel. The embodiment of the apparatus with releasable modules can be provided with a relatively heavy lower frame structure providing a low point of gravity and thus high stability. Modules can also be exchanged with other modules to provide extra flexibility. An example is the change over of one or more modules to amend the functionality of the apparatus or for service/maintenance of individual modules.

The intermediate module can be a ladder and platform module that connect onto one or more central bridges. Such a central bridge can not only be used as carrying structure for the segment holder and the guide but also to provide access to an operator and service engineer. The lower frame structure can be provided with driving means to move the apparatus or at least one module of the apparatus.

In a further preferred embodiment the lower frame structure is provided with coupling means for cooperation with one or more magazine holders providing at least one second storage position. Such a magazine can be the second storage position which may accommodate one or more conveyor segment to be manipulated. Preferably, where it is constructed to hold more than one segment, it can be designed to stack the segments one on top of another. Conveyor segments may be placed in the magazine by a fork lift or other load mover, preferably two or more at a time. The fork lift or other load mover may work from a conveyor segment storage area which contains perhaps 50 or more conveyor segments. The second storage position may also comprise a rack of aligning members to assure the conveyor segments are in the proper position for picking up by the apparatus according the present invention.

In an embodiment with the segment holder rotatably connected to the guide with an intermediate rotation axis for instance a pivot or a shaft the position of the segment holder can adapted to fit the position of a segment to be handled or the position of location where a segment has to be positioned. The segment holder is preferable self-locating. If the segment holder is also provided with a motion dampener manipulation of conveyor segments is permitted rapidly as the motion dampeners stabilize any oscillations of the conveyor segments while suspended from the segment holder. E.g. a double acting hydraulic cylinder can provide the dampening to dampen oscillations of the conveyor segment holder around rotation axis. Motion dampening of the segment holder makes it possible to run the apparatus at higher speed and thus to enhance the efficiency of the apparatus. The segment holder normally, but not exclusively, comprises a trolley and a set of hooks. The hooks can be self-locking.

To minimize the length and complexity of the transport path of the segments it is preferred that the second storage position for at least one segment is situated substantially adjacent to the first position. It is also an option that the apparatus comprises two second storage positions located on opposite sides of the first position. This multiplies the storage capacity of the apparatus and thus makes the apparatus less vulnerable for temporary logistical failure in the handling of segments outside the apparatus. The apparatus may also comprise a plurality of segment holders. All such segments holders could be guided by a collective guide. Where two magazines are employed, two trolleys and lifting mechanisms may be coordinated so that one may be picked up while another is in place for insertion into the launch platform, where a third segment is moving into the mine. This further enhances the capacity of the apparatus and makes is less vulnerable for failure.

The invention also provides a method for moving a mine conveyor segment between a first position in line with a train of conveyor segments and a second storage position for at least one conveyor segment out of line with the train of conveyor segments, comprising the steps of: A) attaching a segment holder to a conveyor segment located on one of the positions, B) lifting the conveyor segment with the segment holder, C) moving the lifted conveyor segment to a stand-by position substantially directly over the other position, D) lowering the lifted conveyor segment to the other position, and E) releasing the segment holder from the conveyor segment, wherein the steps A)-C) are operated independently from the situation at the other position. Normally in the handling of a single conveyor segment the steps A)-E) are subsequent steps however the present method enables some overlap of subsequent steps. In a preferred use of the method the steps A)-E) are hydraulically driven. For further advantages of the method according the invention reference is made to the foregoing description of the present apparatus. As also explained before the processing speed can de increased if and when the movements of the segment holder are actively stabilized, e.g. spring loaded, using motion dampeners and/or if at least two conveyor segments are handled at least partially simultaneously.

Figure 2:
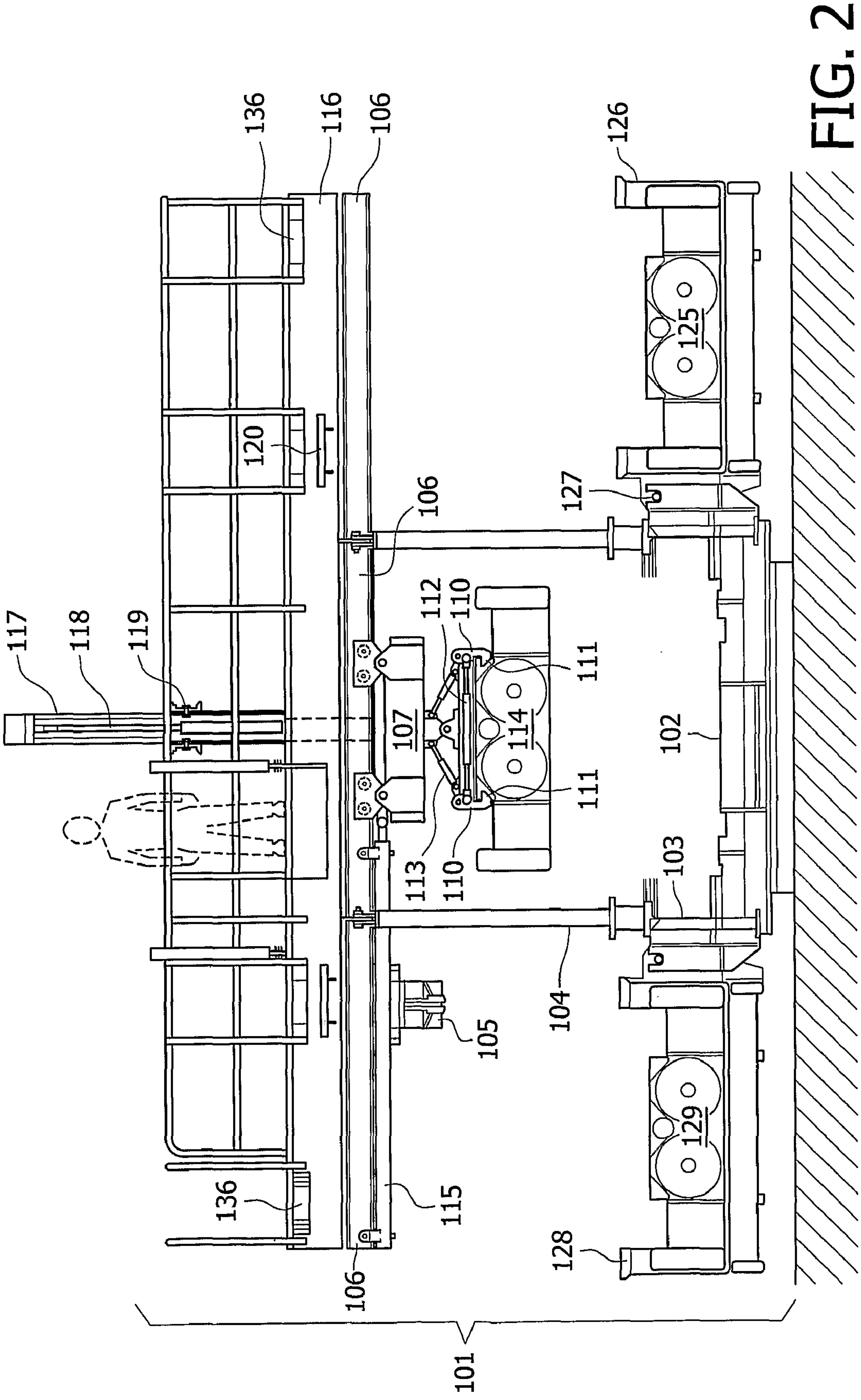
Figure 3:
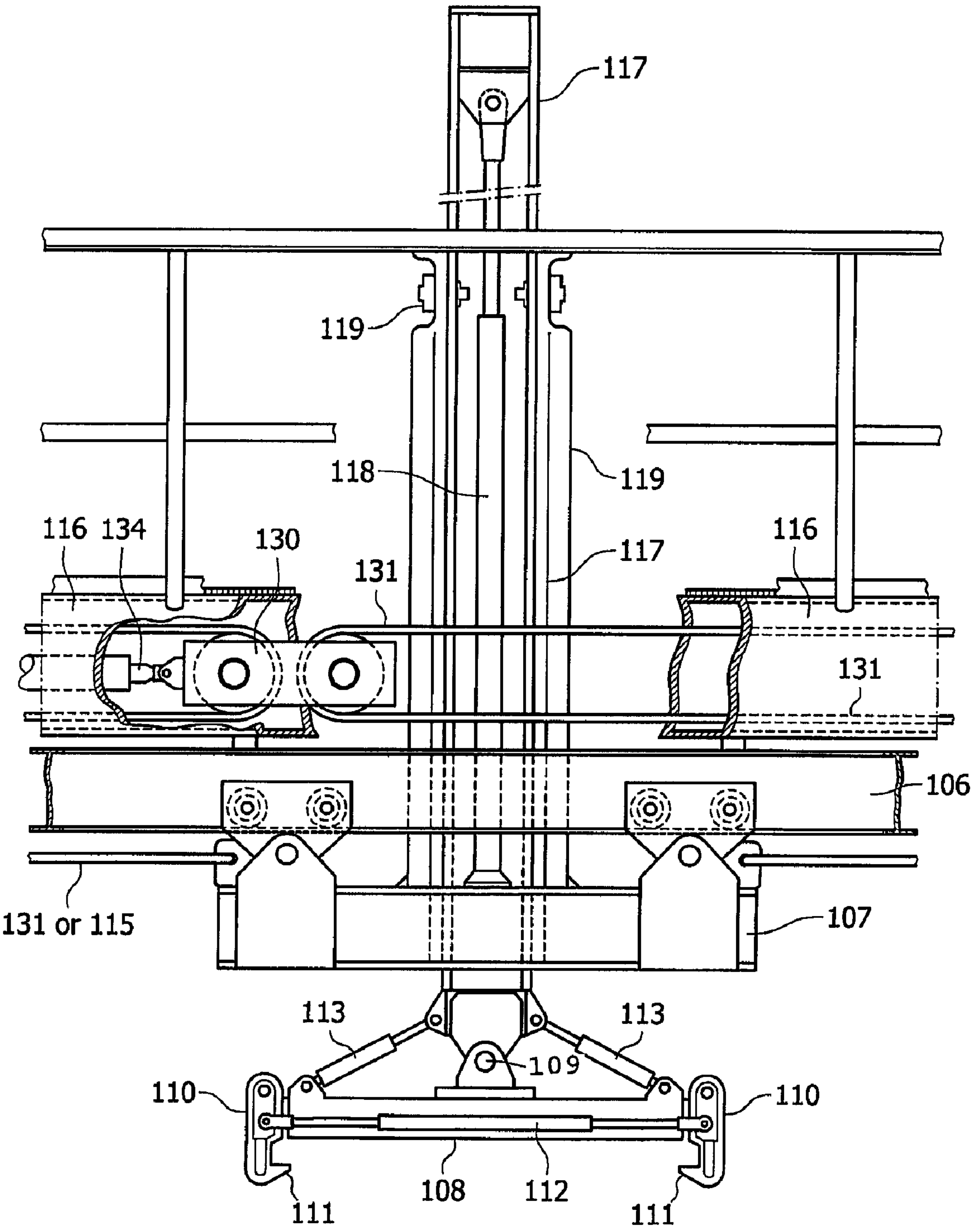
Figure 4:
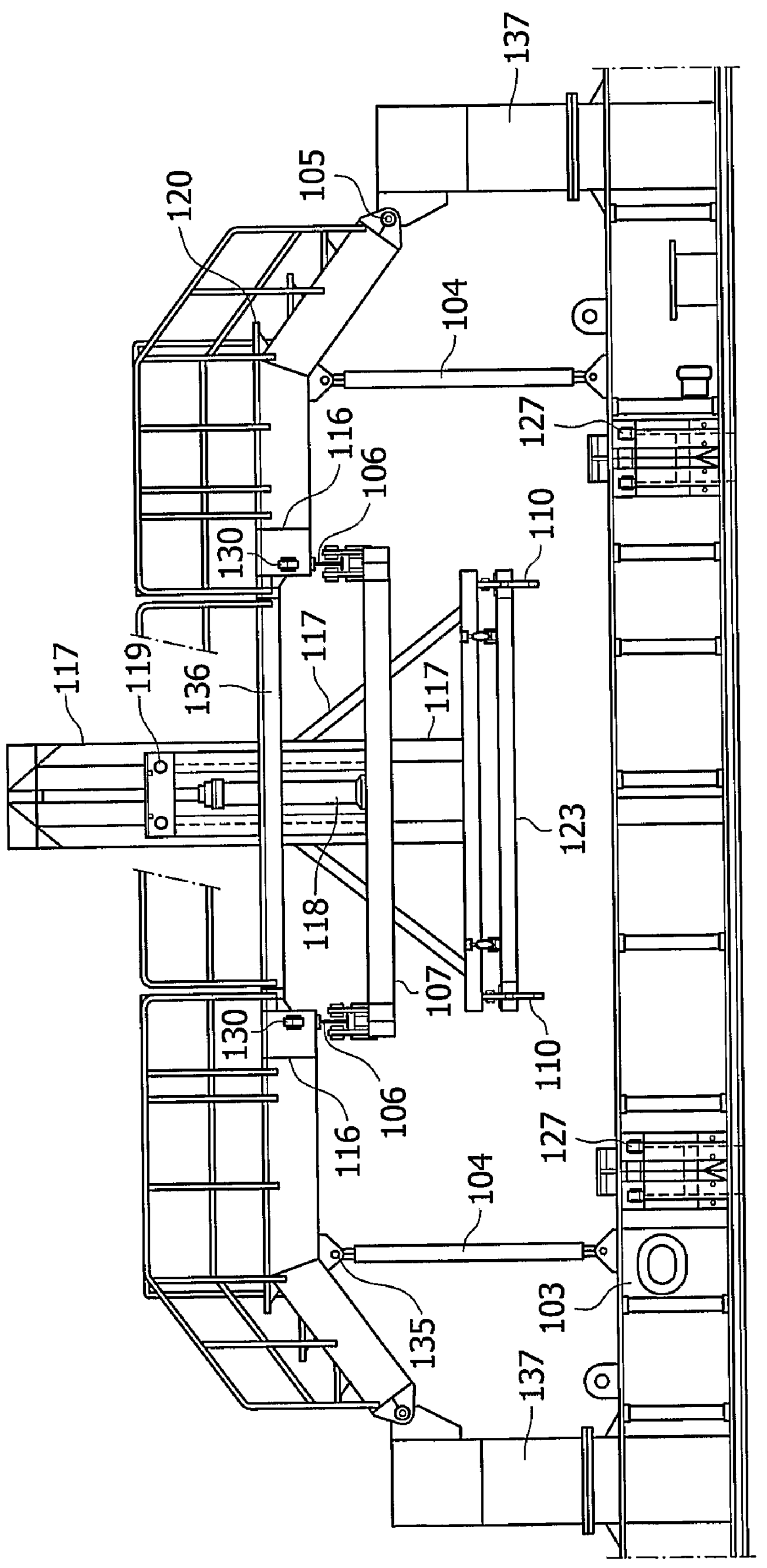
Figure 5:
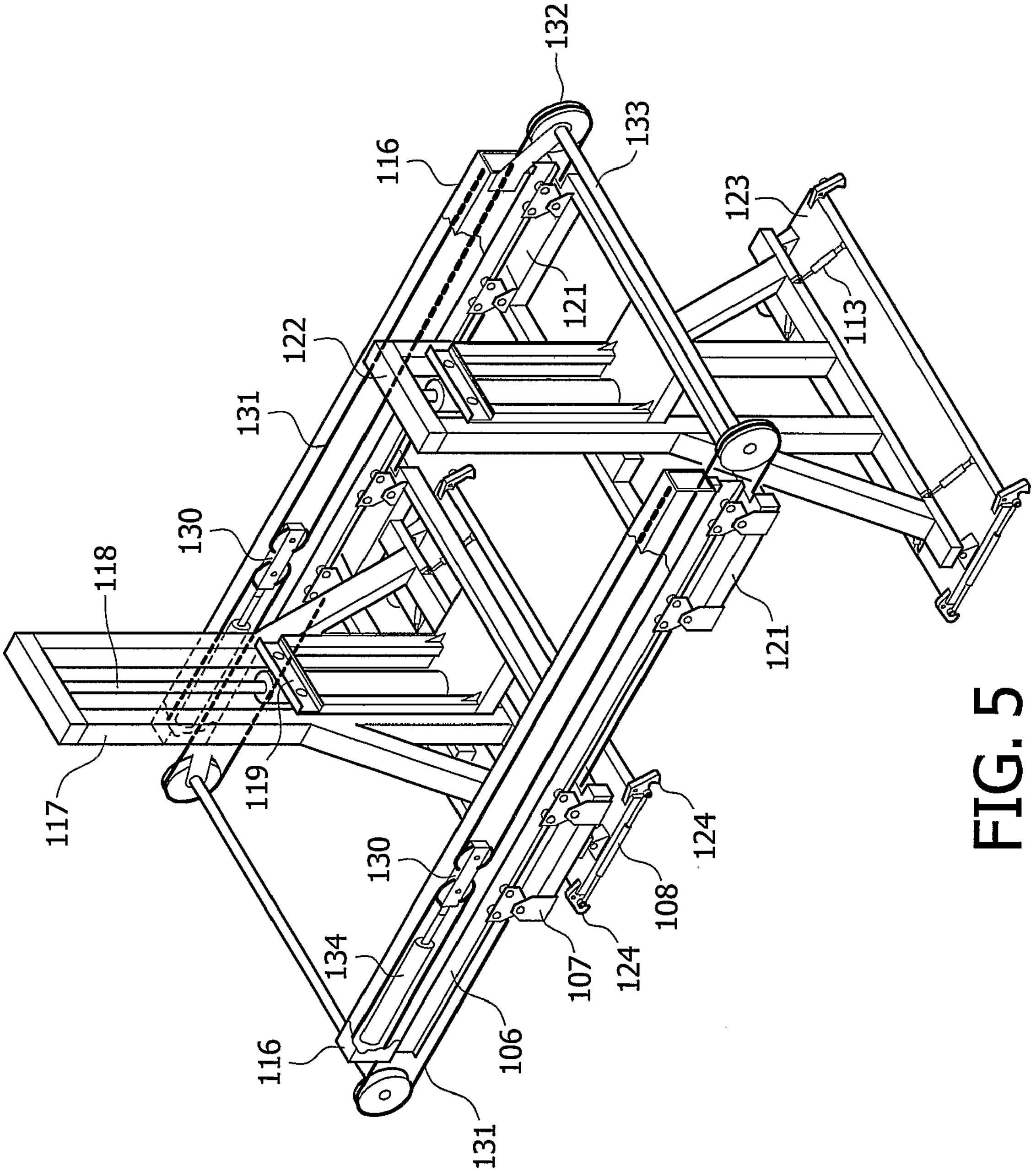

The invention will further be elucidated on the basis of non-limitative embodiments shown in the following figures. Herein:

FIG. 1 shows a perspective view on an apparatus according the invention for manipulating conveyor segments, FIG. 2 shows a front view of the loader/unloader—that is, looking at it from the mine entrance, FIG. 3 shows an enlarged view of a trolley assembly of a type shown in FIG. 2, FIG. 4 shows a side view of a preferred version or the invention, and FIG. 5 shows a perspective view of a preferred actuating system for the trolleys with double segment holders.

FIG. 1 shows a general perspective view on an apparatus 1 for manipulating conveyor segments 2, 3. The apparatus 1 is designed to be readily assembled and dissembled in modules 4, 5, 6, 7, 8, 9. The modules 4, 5, 6, 7, 8, 9 comprise a front ladder and platform module 4, a rear ladder and platform module 5, two central bridge modules 6, 7 between the front and rear ladder platforms 4, 5, one guiding module 8 including a vertically movable segment holder 9 for gripping a conveyor segment 2, 3, and a basis frame 10. In relation to this FIG. 1 only a brief and general explanation will be given; for more details reference is made to more detailed descriptions of some preferred embodiments of the apparatus according the invention in the FIGS. 2-5. On a longitudinal side of the basic frame 10 is connected a magazine 11. In the magazine 11 several conveyor segments 2 can be stacked at what is named a second storage position in this application. The conveyor segment 3 is located at a position that is named a first position in line with (not in this figure shown) a train of conveyor segments and which first position is part of a (not further detailed illustrated) device for manipulating the train of conveyor segments. The movable segment holder 9 can move the conveyor segments 2, 3 in between the first and second positions driven by hydraulic drive means 12, 13, 14. The basis frame 10 is carried by caterpillar drives 15.

FIG. 2 is a sectional view through a loader/unloader 101. The loader/unloader 101 includes a launch bed 102, side retaining members 103 and crane assembly supports 104. Trolley assembly 107 rides on rail guide 106. Attached to trolley assembly 107 are pivoted segment holder arms 110 having hooks 111 at their ends. Arms 110 and hooks 111 are actuated by hydraulic cylinder 112. The trolley assembly 107 carries above it vertical actuator frame 117, containing double acting vertical cylinder 118, kept in place by elevator frame guides 119. Double-acting motion dampeners 113 restrain the inertial movement of suspended conveyor segment 114 around pivot pin 109 (see FIG. 3) when trolley assembly 107 is moved, particularly when it is moved suddenly.

Rail guide 106 extends beyond support members 104 and launch bed 102. Typical use is made of a two vertical lift positions set up with direct connection cylinder 115 to trolley assembly 107. Traverse transport cylinder 115 mounted below rail 106 acts to move the trolley assembly 107, which is further illustrated in FIG. 3. A conveyor segment 114 is shown being held by hooks 111 above launch bed 102. An additional (optional) trolley assembly 121 having gripper frame 123, vertical actuator frame 122, and segment holder arms 124 similar to arms 110 is shown oriented over magazine 126. Magazine 126 may be connected to launch platform 102 by a simple pin 127 resting in a cradle on launch platform 102. Situated within magazine 126 is a conveyor segment 125, ready to be lifted by segment holder 107, 121. Also shown is a second magazine 128 on the opposite side of the launch platform 2; this magazine contains a third conveyor segment 129; at least one more such conveyor segment, not shown, may be placed on top of conveyor segment 129. A tubular reinforcement 116 also extends the wide of the machine.

FIG. 3 provides somewhat more detail of a conveyor segment holder 117 or 121 of FIG. 2. Hooks 111, powered by hydraulic cylinder 112, will hold a conveyor segment between arms 110. Also seen in FIG. 3 is pivot pin 109, from which the gripper frame 108 is suspended, containing hydraulic cylinder 112 for actuating the arms 110. The vertical stroke of the double acting cylinder 118, held within elevator actuator frame 117, will determine the vertical distance the gripper frame 108 may move up and down, carrying its conveyor segment cargo with it between arms 110 and on hooks 111. This vertical distance may determine the number of conveyor segments that may be stacked in the magazine, since it also generally sets the height of rail 106. The magazines 126 and 128 (FIG. 2) should be able to accommodate at least two stacked conveyor segments. Tubular reinforcement 116 is shown cut to expose pulley block 130 and endless cable 131 thereon; pulley block 130 is connected to actuator 134. As will be seen in FIG. 4. The cable 131 is connected to move trolley assembly 107.

The side sectional view of FIG. 4 omits the conveyor segments, but shows the two rails 106 which support trolley assembly 107. Tubular support 116, elevator actuator frame 117, elevator frame guide 119, and double acting cylinder 118 are also shown. In addition to crane assembly supports 104, base connectors 105 are seen to support the ladders 120 leading to bridge 136. Connectors 105 are readily removable, preferably tapered hammer pins with security locks, so the machine may be dissembled quickly. Supports 104 are also quickly and easily disconnected.

FIG. 5 is a perspective view that shows the pulley blocks 130 and endless cables 131 for moving the trolley assemblies 107 and 121. Vertical actuator frames 117 and 122 are also depicted; vertical actuator frame 122 is shown in the lowered position, suspending gripper frame 123.

Referring again to FIGS. 2, 3, 4 and 5, the loader/unloader is seen to be preferably constructed in modules, so that it can be easily set up, disassembled, moved, and reassembled at a nearby or remote site. Looking first at FIG. 4, the front and rear modules comprise the ladders 120 and associated bridge 136, the trolley modules (one or two), comprising the trolley assembly 107 and its associated parts, notably the elevator actuator frame 117 and its contents, and the connecting bridge 136 between the ladders 120. This framework, comprising the ladders 120 and the bridge 136, connected to end supports 137, provide extra strength and reinforcement which is particularly beneficial when the conveyor train is long.

When the train is long, the force required to push it into the coal vein increases accordingly; in addition, when it is known that the train will be long, it is necessary to supply the rig with a large amount of cable on a reel having a relatively high center of gravity (see the Antoline and Es U.S. Pat. No. 6,042,191). The increased weight of the reel at a high center of gravity introduces additional instability. The present construction, incorporating the steps and bridge as a reinforcing structural member for the entire assembly, prevents or inhibits the flexing and other effects of strain on the launch platform and associated apparatus.

As already explained in relation to FIG. 1 the loader/unloader is designed to be readily assembled and dissembled in modules. The modules include knockdown connectors or any other readily removed connectors so the modules can be loaded on a truck or otherwise shipped separately, or simply moved to a different site in the mine area, with a minimum of time lost. For moving the launch platform from a mine entrance to the next mine entrance to be begun, the magazines are simply disconnected at pins 127.

A feature of the invention is the preferred use of double acting cylinders for the motion dampeners 113. As an object of the invention is to increase the speed and efficiency of the loading and unloading processes, it will be understood that it is intended for the trolley to move horizontally as fast as conveniently possible and for the up and down movement of the gripper to also be as fast as the equipment will permit. Accordingly, the typical operation of the invention will be that a trolley 107 or 121 is positioned at the top of a magazine 126, the gripper frame 123 is lowered and grasps the uppermost conveyor segment 125, lifts it upwards, usually to the top of its stroke; then the trolley moves horizontally to position the conveyor segment over the launch bed 102, where it stays in stand-by position, ready to lower it quickly into place on the launch bed, where it is pushed as quickly as possible into position on the end of the train (not shown) of similar conveyor segments, and further pushed, along with the entire train by mechanisms not shown, into the mine. The use of motion dampeners 113 permits this process to proceed fast because there is no danger or lost motion by inertia, oscillation, or pendulum-type swinging or the conveyor segments.

The invention further permits improved efficiency by linking two trolley assemblies in tandem. While one trolley is positioned to pick up a conveyor segment from one of the two magazines, the other is positioned to deposit a conveyor segment in the launch platform 102.

Another feature of the invention is that the pivot pin 109 in the gripper assembly, together with the ability to actuate the segment holder arms 110, permit the operator to take hold of a conveyor segment 125 that is resting at an angle, rather than substantially horizontally, in the magazine 126. Bearing in mind that the loader/unloader is likely to he located in an unpaved and imperfectly leveled area, it is to be expected that the magazine will, in turn, not be level, this feature is quite important to the everyday operation of the machine.

Whether the machine is loading or unloading (adding conveyor segments to the train or laking them off), the invention includes a series or movements of the conveyor segments whereby the positioning of a segment for insertion, for example, is effected while the next previously positioned segment is being moved into the mine on the end of the train. Conversely, while one segment is being placed in the magazine, or positioned for placement in the magazine, another may be moved onto the launch platform or hoisted upwardly from it. Where there are two magazines, two trolleys, and two conveyor segment holders, this sequence of operation can he quite efficient. Numerous iterations of the conveyor segment placement and removal sequences can he performed rapidly and efficiently.

Although an operator is preferably stationed at a control panel on the bridge or elsewhere, it is to be understood that various portions of the apparatus and method lend themselves well to automation. Regardless of the extent of automation, hands-on control panels. automatic controls, overrides, safety features and the like, it is to be understood that the invention is not limited to the devices and methods specifically described herein to move the trolleys and conveyor segment holders, and/or to grasp the conveyor segments. The invention includes the use of single or multiple trolleys and conveyor segment holders for use with a single magazine or two magazines, the use of hydraulic cylinders to move the trolleys and/or conveyor segment holders with or without cables and pulley blocks, any configuration where multiple trolleys or conveyor segment holders and maintained a fixed horizontal distance apart (sometimes referred to as tandem), any configuration where the movements of multiple trolleys or conveyor segment holders are controlled entirely independently, and any effective device for moving the conveyor segments up and down.

The invention claimed is:

1. Apparatus for moving a mine conveyor segment between a first position in line with a train of conveyor segments and a second storage position for at least one conveyor segment out of line with the train of conveyor segments, comprising:

a segment holder, and a guide for guiding the movement of the segment between the first and second position, wherein the apparatus is connectable to a device for manipulating the train of conveyor segments such that the segment holder is at least partially moveable independent from the train manipulating device, and wherein the apparatus is constructed of releasable modules, the modules comprising:

a lower frame structure, a front intermediate module, a rear intermediate module, at least one bridge module carrying the segment holder and the guide, wherein the bridge module is releasable connectable to the intermediate modules, which intermediate modules are releasable supportable by the lower frame structure.

2. Apparatus according to claim 1, wherein the segment holder is displaced relative to the guide by hydraulic actuating means.

3. Apparatus according to claim 1, wherein the segment holder is displaceable with at least two levels of freedom.

4. Apparatus according to claim 1, wherein the lower frame structure is provided with coupling means for cooperation with a conveyor segment launch platform.

5. Apparatus according to claim 1, wherein the lower frame structure is provided with coupling means for cooperation with one or more magazine holders providing at least one second storage position.

6. Apparatus according to claim 1, wherein the segment holder is rotatably connected to the guide with an intermediate rotation axis.

7. Apparatus according to claim 1, wherein the segment holder is provided with a motion dampener.

8. Apparatus according to claim 1, wherein the segment holder comprises a trolley and a set of hooks.

9. Apparatus according to claim 1, wherein the second storage position for at least one segment is situated substantially adjacent to the first position.

10. Apparatus according to claim 1, wherein the apparatus comprises two second storage positions located on opposite sides of the first position.

11. Apparatus according to claim 1, wherein the apparatus comprises a plurality of segment holders.

12. Method for moving a mine conveyor segment between a first position in line with a train of conveyor segments and a second storage position for at least one conveyor segment out of line with the train of conveyor segments using the apparatus of claim 1, comprising the steps of:

A) attaching the segment holder to a conveyor segment located on one of the positions, B) lifting the conveyor segment with the segment holder, C) moving the lifted conveyor segment to a stand-by position substantially directly over the other position, D) lowering the lifted conveyor segment to the other position, E) releasing the segment holder from the conveyor segment, wherein the steps A)-C) are operated independently from the situation at the other position.

13. Method according to claim 12, wherein the steps A)-E) are hydraulically driven.

14. Method according to claim 12, wherein the movements of the segment holder are actively stabilized.

15. Method according to claim 12, wherein at least two conveyor segments are handled at least partially simultaneously.

* * * * *